(12) United States Patent
Nonoyama

(10) Patent No.: US 7,685,995 B2
(45) Date of Patent: Mar. 30, 2010

(54) CONTROLLER FOR INTERNAL COMBUSTION ENGINE

(75) Inventor: Kazutaka Nonoyama, Kariya (JP)

(73) Assignee: DENSO Corporation, Kariya (JP)

( * ) Notice: Subject to any disclaimer, the term of this patent is extended or adjusted under 35 U.S.C. 154(b) by 23 days.

(21) Appl. No.: 12/149,335

(22) Filed: Apr. 30, 2008

(65) Prior Publication Data

US 2008/0312810 A1 Dec. 18, 2008

(30) Foreign Application Priority Data

Jun. 13, 2007 (JP) .............................. 2007-156894
Jul. 5, 2007 (JP) .............................. 2007-177804

(51) Int. Cl.
*F02P 5/00* (2006.01)
(52) U.S. Cl. .............................. 123/406.31; 123/406.47
(58) Field of Classification Search ................. 123/1 A, 123/198 A, 305, 406.16, 406.29, 406.3, 406.31, 123/406.37, 406.47
See application file for complete search history.

(56) References Cited

U.S. PATENT DOCUMENTS 4,957,087 A 9/1990 Ota
5,109,821 A 5/1992 Yoshida et al.
7,320,297 B2 * 1/2008 Kamio et al. ................ 123/1 A

FOREIGN PATENT DOCUMENTS

JP 2-56835 4/1990
JP 2008-309047 * 12/2008

* cited by examiner

*Primary Examiner*—Hai H Huynh
(74) *Attorney, Agent, or Firm*—Nixon & Vanderhye P.C.

(57) ABSTRACT

The alcohol concentration detection value estimated or detected by the alcohol concentration sensor is corrected in accordance with intensity, frequency and the like of knocking to set the alcohol concentration detection value after the correction as the alcohol concentration for ignition timing control. Thereby, occurrence of the knocking can be prevented by changing ignition timing in accordance with the knocking state. In regard to the fuel injection control, the alcohol concentration detection value before the correction is used as the alcohol concentration for fuel injection control as it is without using the alcohol concentration detection value corrected in accordance with the knocking state. This prevents a fluctuation of the fuel injection quantity due to correcting the alcohol concentration detection value in accordance with the knocking state, leading to prevention of a torque fluctuation or combustion deterioration.

16 Claims, 12 Drawing Sheets

CONTROLLER FOR INTERNAL COMBUSTION ENGINE

CROSS-REFERENCE TO RELATED APPLICATION

This application is based on Japanese Patent Applications No. 2007-156894 filed on Jun. 13, 2007 and No.-2007-177804 filed on Jul. 5, 2007, the disclosures of which are incorporated herein by reference.

FIELD OF THE INVENTION

The present invention relates to a controller for an internal combustion engine provided with alcohol concentration detector which detects or estimates alcohol concentration of fuel supplied to the internal combustion engine.

BACKGROUND OF THE INVENTION

There is known a system which can use alcohol such as ethanol or methanol, or mixture fuel formed by mixing alcohol and gasoline as fuel in an internal combustion engine mounted in a vehicle. Such a system detects alcohol concentration of the fuel supplied to the internal combustion engine by an alcohol concentration sensor and corrects ignition timing or a fuel injection quantity in accordance with an alcohol concentration detected by the alcohol concentration sensor, thereby controlling the ignition timing or the fuel injection quantity to a proper value in accordance with the alcohol concentration. In a case where the alcohol concentration sensor is out of order, however, the ignition timing or the fuel injection quantity can not be controlled to the proper value in accordance with the alcohol concentration.

JP-4-12171A (U.S. Pat. No. 5,109,821) shows a system in which, at the abnormal time of the alcohol concentration sensor (blend ratio sensor), an alcohol concentration detection value (blend ratio) is corrected in accordance with knock information detected by a knock sensor. The ignition timing and a fuel injection quantity are set by using the alcohol concentration detection value after the correction, thus preventing occurrence of knocking.

JP-7-6430B (U.S. Pat. No. 4,957,087) shows a system in which, when it is determined that the alcohol concentration sensor is abnormal, the ignition timing is fixed to ignition timing for a gasoline engine (that is, ignition timing when the alcohol concentration is 0%) at the time of stopping an air-fuel ratio feedback control (at open-loop controlling).

According to JP-4-12171A, the ignition timing is set by using the alcohol concentration detection value corrected in accordance with the knock information when a detection accuracy of the alcohol concentration detection value deteriorates due to the abnormality of the alcohol concentration sensor. Therefore, occurrence of the knocking can be prevented by varying the ignition timing in accordance with a state of the knocking (presence/absence or intensity of the knocking). However, since the fuel injection quantity is corrected by using the alcohol concentration detection value corrected in accordance with the knock information, the fuel injection quantity is varied depending on the state of the knocking, possibly creating occurrence of a torque fluctuation or instability of a combustion state.

Generally, as the alcohol concentration of fuel supplied to an internal combustion engine becomes higher, a knock limit moves to a more advanced side. the present inventors have, as shown in FIGS. 6 and 7, studied an ignition timing control system in which the alcohol concentration (for example, ethanol concentration) becomes higher, the ignition timing is further advanced to increase torque. It is considered that also in this ignition timing control system, as described in JP-7-6430B, when it is determined that the alcohol concentration detection means such as the alcohol concentration sensor is at a failure, the ignition timing is retarded and fixed to the ignition timing for gasoline (to ignition timing when the alcohol concentration is 0%). With this way, even in a case where an actual alcohol concentration is relatively low, it is prevented that the ignition timing goes to an advance side over the knock limit, preventing occurrence of the knocking. However, in a case where the actual alcohol concentration is relatively high, a retard quantity of the ignition timing is excessively large, which possibly causes large reducing of the output torque.

SUMMARY OF THE INVENTION

The present invention is made in view of the foregoing problem and it is an object of the present invention to provide a controller for an internal combustion engine which can prevent a fluctuation of a fuel injection quantity due to correction of an alcohol concentration detection value of fuel while preventing occurrence of knocking by the correction of the alcohol concentration detection value.

It is a further object of the present invention to provide an ignition control device for an internal combustion engine which can restrict a reduction of output while preventing occurrence of knocking at an abnormal time of alcohol concentration detector.

According to a first aspect of the present invention, a controller is for an internal combustion engine provided with alcohol concentration determining means which detects or estimates alcohol concentration of fuel supplied to the internal combustion engine. The controller includes alcohol concentration setting means for fuel injection control which sets an alcohol concentration detection value detected or estimated by the alcohol concentration determining means as alcohol concentration for fuel injection control. The controller includes knock determining means which determines a knocking state of the internal combustion engine. The controller further includes alcohol concentration setting means for ignition timing control which corrects the alcohol concentration detection value in accordance with the knocking state determined by the knock determining means and sets the alcohol concentration detection value after the correction as alcohol concentration for ignition timing control.

Since in this construction, the alcohol concentration detection value is corrected in accordance with the knocking state (presence/absence, intensity, frequency and the like of knocking) to use the alcohol concentration detection value after the correction as the alcohol concentration for ignition timing control, just in case a detection accuracy of the alcohol concentration detection value deteriorates due to abnormality of the alcohol concentration determining means, occurrence of knocking can be prevented by changing ignition timing in accordance with the knocking state.

In regard to the fuel injection control, the alcohol concentration detection value detected or estimated by the alcohol concentration determining means is used as the alcohol concentration for fuel injection control as it is without using the alcohol concentration detection value corrected in accordance with the knocking state. This can prevent a fluctuation of the fuel injection quantity from occurring in accordance with the knocking state. In consequence, occurrence of the knocking can be prevented while preventing the fluctuation of the fuel injection quantity due to the correction of the alcohol concentration detection value to prevent a torque fluctuation or combustion deterioration.

In addition, according to a second aspect of the present invention, in a controller for an internal combustion engine provided with alcohol concentration detecting means which detects alcohol concentration of fuel supplied to the internal combustion engine and ignition timing setting means which sets ignition timing in accordance with an alcohol concentration detection value detected by the alcohol concentration detecting means, abnormality diagnosis means determines presence/absence of abnormality of the alcohol concentration detecting means. When it is determined that the abnormality of the alcohol concentration detecting means is present, the ignition timing is set to a more retarded side than at a normal time of the alcohol concentration detecting means by using the alcohol concentration detection value before the determination as to the presence of the abnormality.

In general, it is rare that the alcohol concentration of fuel changes largely after it is determined that the abnormality of the alcohol concentration detecting means is present. Therefore, it is considered that the actual alcohol concentration at an abnormal time of the alcohol concentration detecting means is not so much different from one before the determination as to the presence of the abnormality in the alcohol concentration detecting means, that is, from the alcohol concentration detection value at a normal time of the alcohol concentration detecting means.

Accordingly, when it is determined that the abnormality of the alcohol concentration detecting means is present, the ignition timing is set to a more retarded side than at a normal time of the alcohol concentration detecting means. In this way, even if the actual alcohol concentration at an abnormal time of the alcohol concentration detecting means is lower than the alcohol concentration detection value at a normal time of the alcohol concentration detecting means, it is prevented that the ignition timing goes to an advance side over the knock limit. Occurrence of the knocking can be thus prevented.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EMBODIMENTS

Hereinafter, embodiments in the present invention will be explained with reference with the drawings.

First Embodiment

Figure 1:
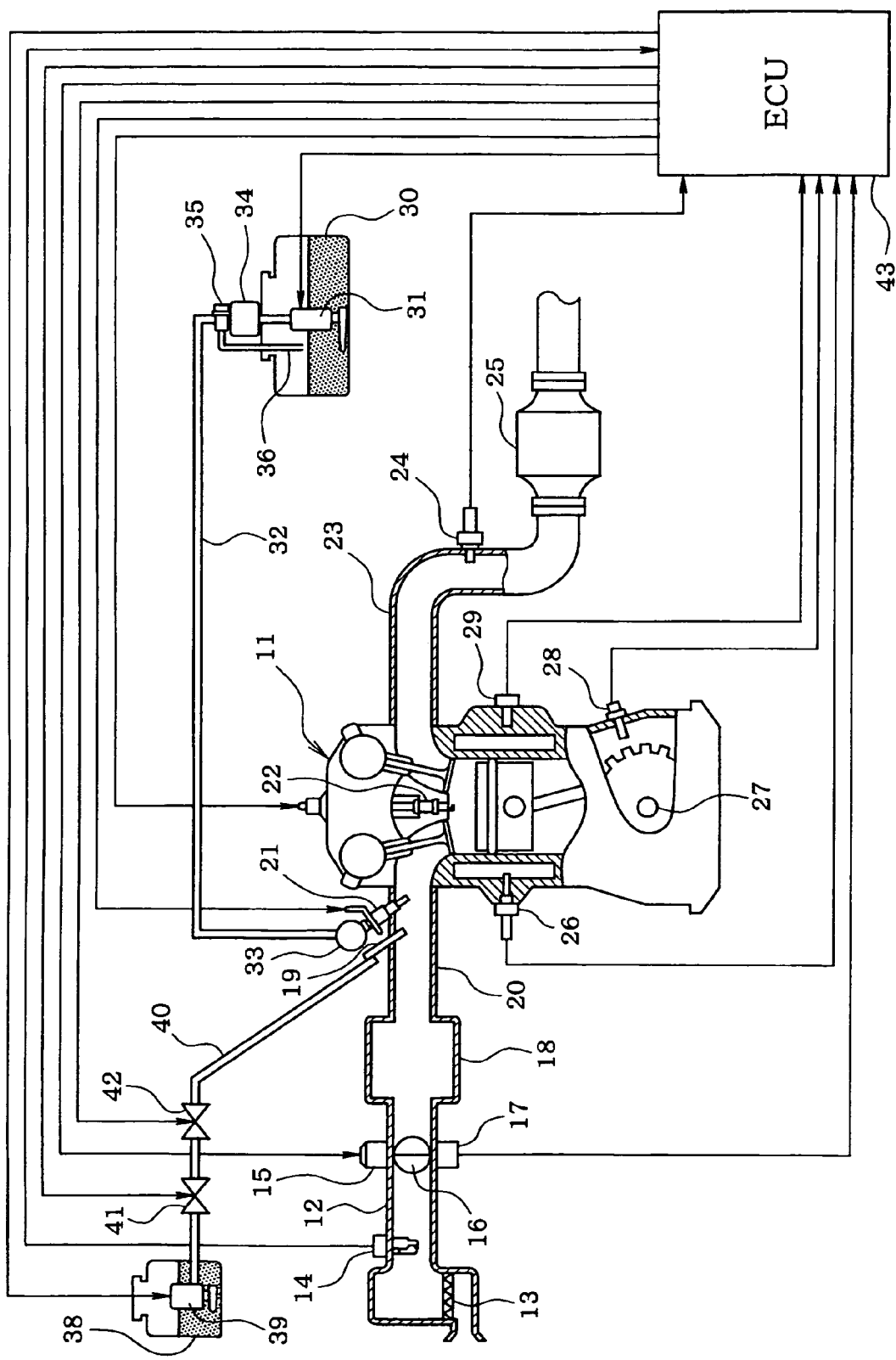
FIG. 1 is a schematic construction diagram showing an entire engine control system in a first embodiment of the present invention.

A first embodiment in the present invention will be explained with reference with FIGS. 1 to 3.

First, a schematic construction of an entire engine control system will be explained with reference with FIG. 1. An air cleaner 13 is provided at the most upstream portion of an intake pipe 12 of an engine 11 as an internal combustion engine and an air flow meter 14 is provided at the downstream side from the air cleaner 13 for detecting an intake air quantity. A throttle valve 16 an opening of which is adjusted by a motor 15 and a throttle opening sensor 17 for detecting an opening of the throttle valve 16 (throttle opening) are provided at the downstream side from the air flow meter 14.

Further, a surge tank 18 is provided at the downstream side from the throttle valve 16 and an intake manifold 20 is provided in the surge tank 18 for introducing air into each cylinder of the engine 11. A fuel injector 21 for injecting main fuel to be described later and an injection nozzle 19 for injecting supplementary fuel to be described later are attached to the vicinity of an intake port of the intake manifold 20 in each cylinder. Further, a spark plug 22 is attached to a cylinder head of the engine for each cylinder and a mixture in the cylinder is ignited by spark discharge of each spark plug 22.

An exhaust gas sensor 24 (air-fuel ratio sensor, oxygen sensor or the like) for detecting an air-fuel ratio, a rich/lean state or the like of the exhaust gas is provided in an exhaust pipe 23 of the engine 11 and a catalyst 25 such as a three-way catalyst for purifying the exhaust gas is provided at the downstream side from the exhaust gas sensor 24.

Further, a coolant temperature sensor 26 for detecting a coolant temperature and a knock sensor 29 for detecting knocking are attached in a cylinder block of the engine 11. A crank angle sensor 28 is attached in an outer periphery of a crank shaft 27 for outputting a pulse signal each time the crank shaft 27 rotates by a predetermined crank angle. A crank angle or an engine speed is detected based upon an output signal of the crank angle sensor 28.

Alcohol such as ethanol and methanol or mixture fuel formed of mixing alcohol and gasoline can be used as fuel of the engine 11 and the alcohol fuel containing the alcohol is supplied to the engine 11 as the main fuel. The mixture fuel or the gasoline having higher volatile properties than the main fuel is supplied to the engine 11 as the supplementary fuel.

A main fuel pump 31 for pumping up the main fuel is provided in a main fuel tank 30 for storing the main fuel. The main fuel discharged from the main fuel pump 31 is supplied through a fuel pipe 32 to a delivery pipe 33 and is distributed from the delivery pipe 33 to the fuel injector 21 of each cylinder. A filter 34 and a pressure regulator 35 are connected to the fuel pipe 32 in the neighborhood of the main fuel pump 31. A discharge pressure of the main fuel pump 31 is adjusted to a predetermined pressure by the pressure regulator 35, and the extra quantity of the main fuel over the pressure is returned back through a fuel return pipe 36 into the main fuel tank 30.

A sub fuel pump 39 for pumping up the supplementary fuel is provided in a sub fuel tank 38 for storing the supplementary fuel. The supplementary fuel discharged from the sub fuel pump 39 is injected through a fuel pipe 40 from the injection nozzle 19. In addition, an on-off valve 41 and a duty control valve 42 are provided in the fuel pipe 40 and a supplementary fuel injection quantity of the injection nozzle 19 is adjusted by controlling an opening of the duty control valve 42.

The output of each aforementioned sensor is inputted to an electronic control circuit (hereinafter, "ECU") 43. ECU 43 is constructed mainly of a microcomputer and by performing various engine control programs stored in ROM (storage medium). The main fuel injection quantity of the fuel injector 21, the supplementary fuel injection quantity of the injection nozzle 19 and the ignition timing of the spark plug 22 are controlled based upon an engine operating state.

ECU 43 determines whether or not a fuel supply region is a supplementary fuel supply region (region where the main fuel volatile can not be sufficiently ensured) based upon the coolant temperature, the alcohol concentration of the main fuel and the like. When it is the supplementary fuel supply region, the supply of the supplementary fuel having higher volatile properties than the main fuel is performed and when it is not the supplementary fuel supply region, the supply of the supplementary fuel is stopped.

In addition, ECU 43 calculates an air-fuel ratio F/B correction quantity in such a manner as to make an air-fuel ratio of an exhaust gas equal to a target air-fuel ratio based upon output of the exhaust gas sensor 24 when a predetermined air-fuel ratio F/B control performance condition is established. Then ECU 43 performs an air-fuel ratio F/B control for correcting the main fuel injection quantity of the fuel injector 21 by using the air-fuel ratio F/B correction quantity. "F/B" means "feedback".

Further, ECU 43 performs an alcohol concentration setting routine in FIG. 2 and sets the alcohol concentration for fuel injection control and the alcohol concentration for ignition timing control as follows.

Figure 2:
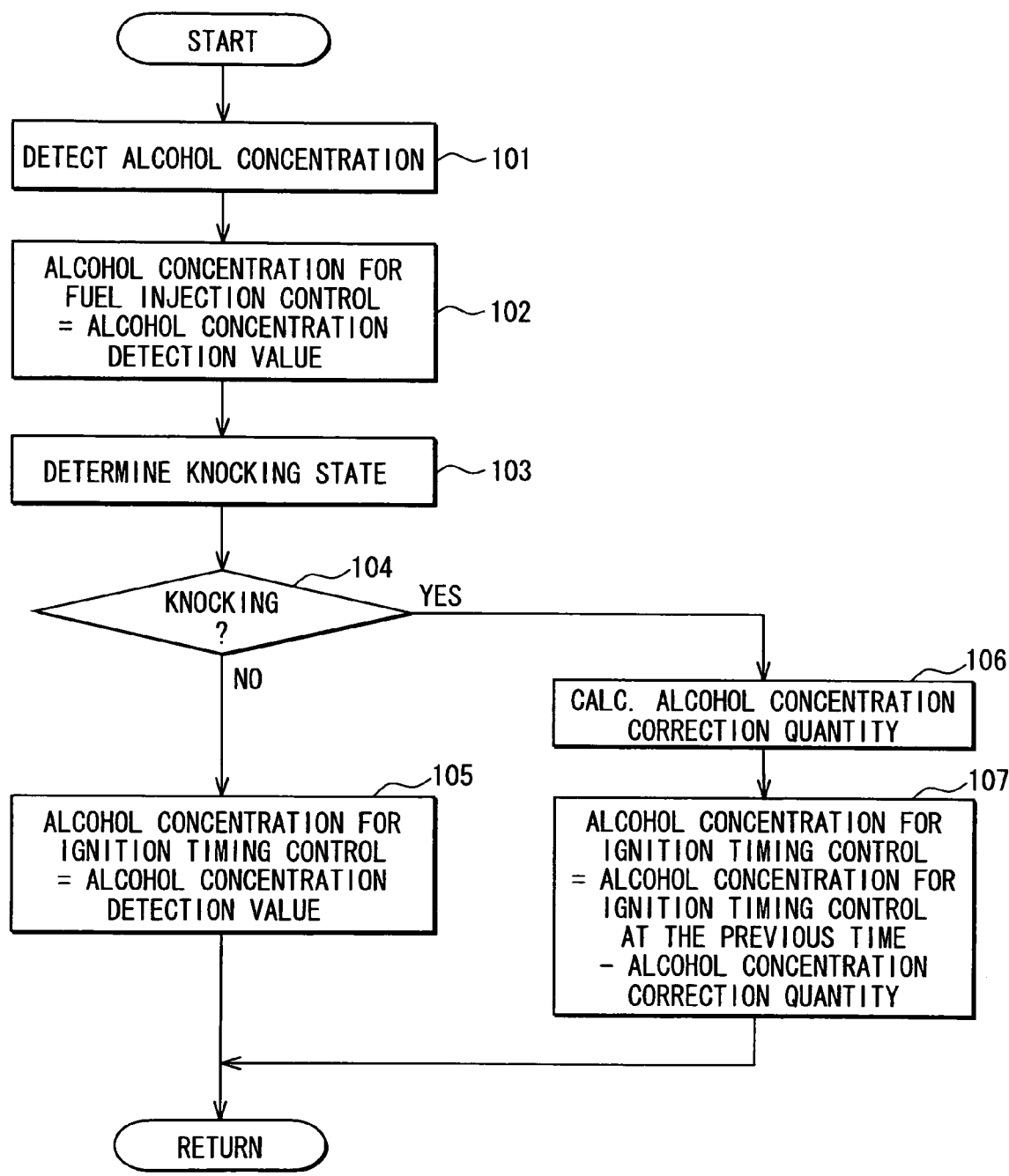
FIG. 2 is a flow chart explaining the process order of an alcohol concentration setting routine in the first embodiment.

The alcohol concentration setting routine shown in FIG. 2 is performed in a predetermined period during power-on of ECU 43. When the present routine is activated, first at step 101, for example, the alcohol concentration of the main fuel is estimated (calculated) based upon at least one of an air-fuel ratio F/B correction quantity, a deviation quantity of an air-fuel ratio, combustion stability (engine rotational fluctuation), engine torque and the like. In a case of a system provided with an alcohol concentration sensor for detecting the alcohol concentration of the main fuel, the alcohol concentration of the main fuel may be detected by the alcohol concentration sensor.

Thereafter, the process goes to step 102, wherein the alcohol concentration detection value estimated or calculated by the alcohol concentration sensor is set as the alcohol concentration for fuel injection control as it is.

Alcohol concentration for fuel injection control=Alcohol concentration detection value.

ECU 43, for example, calculates a fuel injection correction quantity in accordance with the alcohol concentration for fuel injection control by a map or the like and corrects a main fuel injection quantity of the fuel injector 21 by using the fuel injection correction quantity.

Thereafter, the process goes to step 103, wherein a knocking state (presence/absence, intensity, frequency and the like of knocking) is determined based upon an output signal of the knock sensor 29.

Thereafter, the process goes to step 104, wherein it is determined whether or not the knocking occurs based upon the determination result of the knocking state. As a result, in a case where the knocking does not occur, the process goes to step 105, wherein the alcohol concentration detection value is set as the alcohol concentration for ignition timing control as it is.

Alcohol concentration for ignition timing control=Alcohol concentration detection value.

Figure 3:
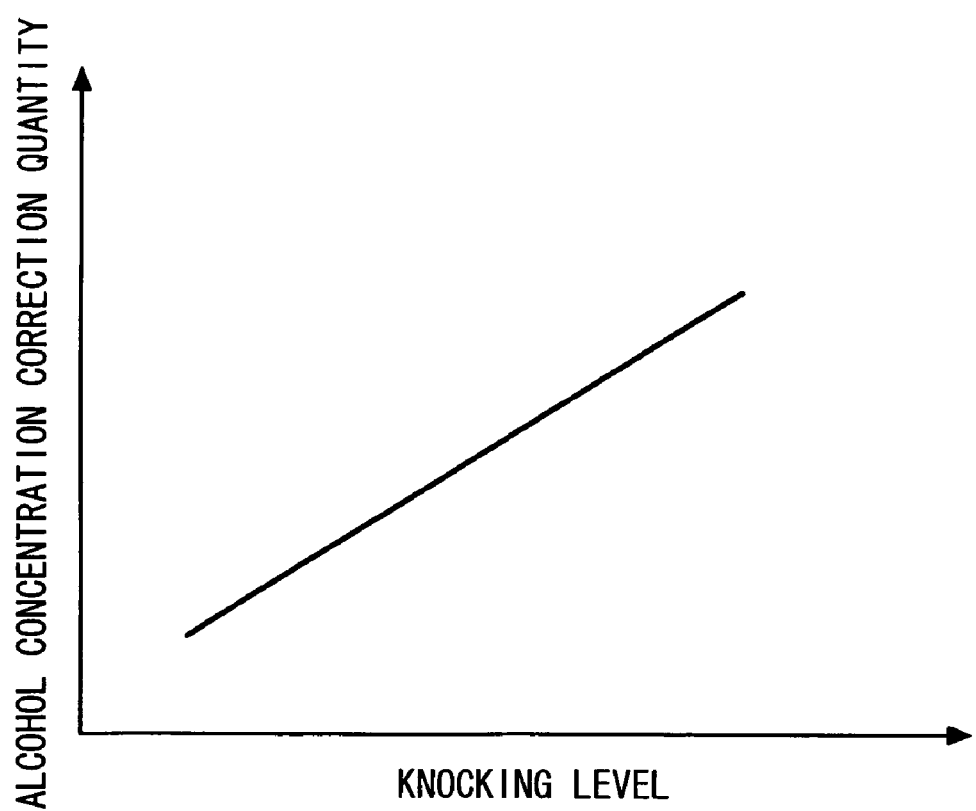
FIG. 3 is a diagram conceptually showing one example of a map of an alcohol concentration correction quantity.

In a case where it is determined at step 104 that the knocking occurs, the process goes to step 106, wherein by referring to a map of an alcohol concentration correction quantity shown in FIG. 3, the alcohol concentration correction quantity is calculated in accordance with a level (intensity, frequency and the like) of the knocking. The map of the alcohol concentration correction quantity shown in FIG. 3 is set such that as the knocking level becomes larger, the alcohol concentration correction quantity increases.

Thereafter, the process goes to step 107, wherein the alcohol concentration (initial value is an alcohol concentration detection value) for ignition timing control at the previous time is corrected in a reducing direction (that is, retard direction of the ignition timing) by using the alcohol concentration correction quantity to find alcohol concentration for ignition timing control at this time.

Alcohol concentration for ignition timing control=Alcohol concentration for ignition timing control at the previous time−Alcohol concentration correction quantity.

Thereby, the alcohol concentration detection value corrected in accordance with the knocking level is set as the alcohol concentration for ignition timing control.

ECU 34 calculates, for example, an ignition timing correction quantity in accordance with the alcohol concentration for ignition timing control by a map or the like and corrects ignition timing of the spark plug 22 by using the ignition timing correction quantity. In general, as the alcohol concentration of fuel supplied to the engine 11 becomes higher, the knock limit of the ignition timing transfers to a more advanced side. Therefore, in the map of the ignition timing correction quantity, the ignition timing correction quantity is set such that as the alcohol concentration becomes higher, the ignition timing is advanced (as the alcohol concentration becomes lower, the ignition timing is retarded).

In the first embodiment described above, when the knocking occurs, the alcohol concentration detection value (Alcohol concentration for ignition timing control at the previous time—Alcohol concentration correction quantity) corrected in accordance with the level (intensity, frequency and the like) of the knocking is set as the alcohol concentration for ignition timing control. Therefore, just in case the detection accuracy of the alcohol concentration detection value is deteriorated due to the abnormality of the alcohol concentration sensor, occurrence of the knocking can be prevented by changing the ignition timing in accordance with the knocking state (presence/absence, intensity, frequency and the like).

In regard to the fuel injection control, the alcohol concentration detection value calculated or estimated by the alcohol concentration sensor is set as the alcohol concentration for fuel injection control as it is without using the alcohol concentration detection value corrected in accordance with the knocking state. Therefore, it can be prevented that the fuel injection quantity fluctuates in accordance with the knocking state. In consequence, the fluctuation of the fuel injection quantity due to correction of the alcohol concentration detection value can be prevented, and occurrence of the knocking can be prevented while preventing the torque fluctuation or combustion deterioration due to the fluctuation of the fuel injection quantity.

Second Embodiment

A second embodiment of the present invention will be explained with reference to FIG. 4.

Figure 4:
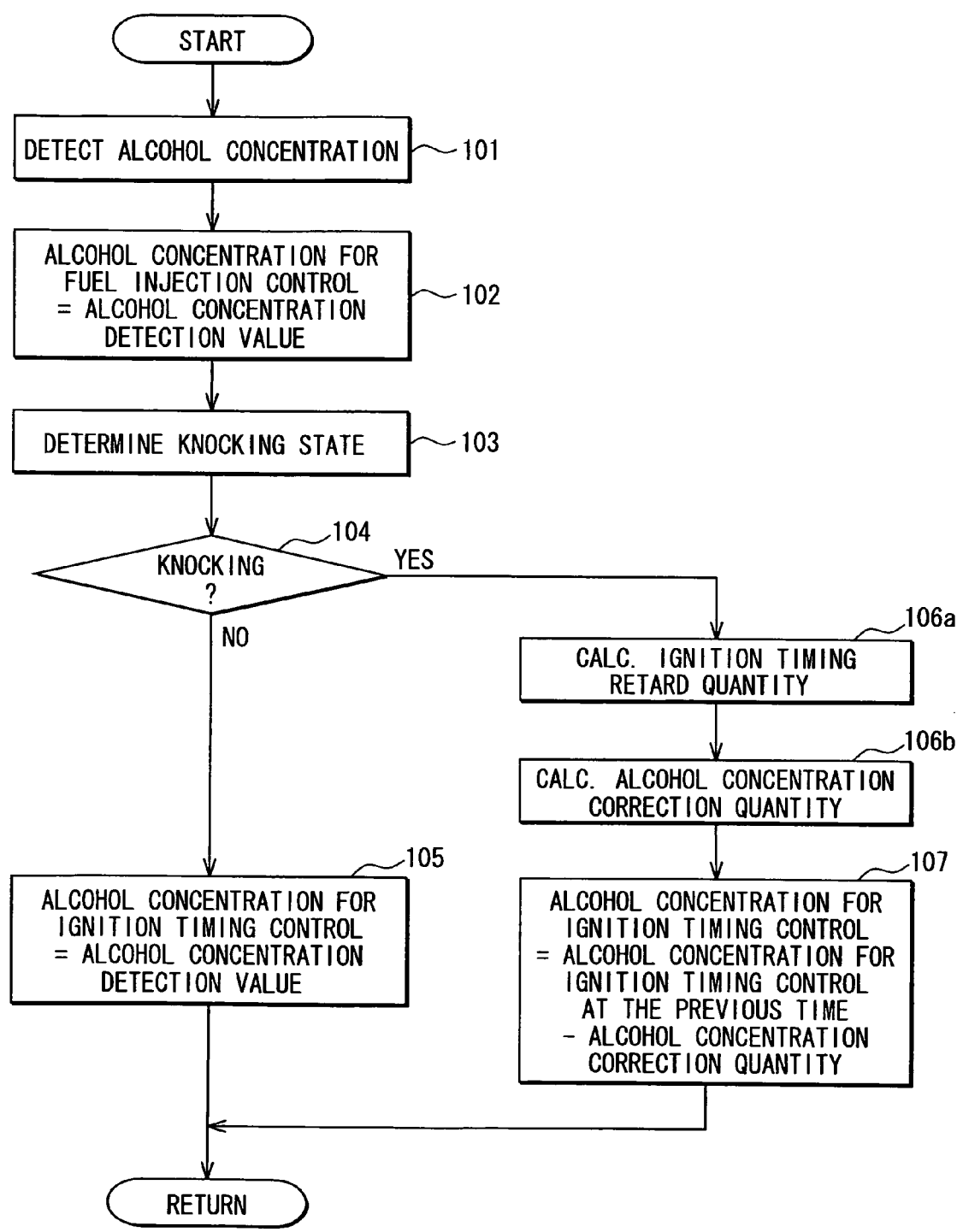
FIG. 4 is a flow chart explaining the process order of an alcohol concentration setting routine in a second embodiment.

In the second embodiment, an alcohol concentration correction quantity is calculated by using an ignition timing retard quantity in accordance with a level (intensity, frequency and the like) of knocking by performing an alcohol concentration setting routine in FIG. 4. Further, an alcohol concentration detection value corrected with use of the alcohol concentration correction quantity is set as alcohol concentration for ignition timing control.

The routine in FIG. 4 changes the process at step 106 in the routine in FIG. 2 explained in the first embodiment into the processes at steps 106a and 106b and the processes of the respective steps other than those are the same as that in FIG. 2.

In the alcohol concentration setting routine in FIG. 4, in a case where it is determined at step 104 that the knocking occurs, the process goes to step 106a, wherein an ignition timing retard quantity in accordance with a level (intensity, frequency and the like) of the knocking is calculated by a map or the like. The map of the ignition timing retard quantity is set such that as the level of the knocking becomes larger, the ignition timing retard quantity increases. The ignition timing retard quantity calculated in accordance with the level of the knocking may be read from the ignition timing control routine (not shown).

Thereafter, the process goes to step 106b, wherein the alcohol concentration correction quantity in accordance with the ignition timing retard quantity is calculated by a map or the like. The map of the alcohol concentration correction quantity is set such that as the ignition timing retard quantity becomes larger, the alcohol concentration correction quantity increases.

Thereafter, the process goes to step 107, wherein the alcohol concentration for ignition timing control at the previous time is corrected by using the alcohol concentration correction quantity to find the alcohol concentration for ignition timing control at this time. Thereby, the alcohol concentration detection value corrected in accordance with the level of the knocking is set as the alcohol concentration for ignition timing control.

In the second embodiment explained above, the alcohol concentration for ignition timing control can be set to a value suitable for ignition timing control by correcting the alcohol concentration detection value using the ignition timing retard quantity in accordance with the knocking level.

Third Embodiment

Next, a third embodiment of the present invention will be explained with reference to FIG. 5.

In a case of applying the present invention to a system capable of accurately detecting alcohol concentration of fuel, it is not always required to correct an alcohol concentration detection value in accordance with a knocking state at a normal time of alcohol concentration detector.

Figure 5:
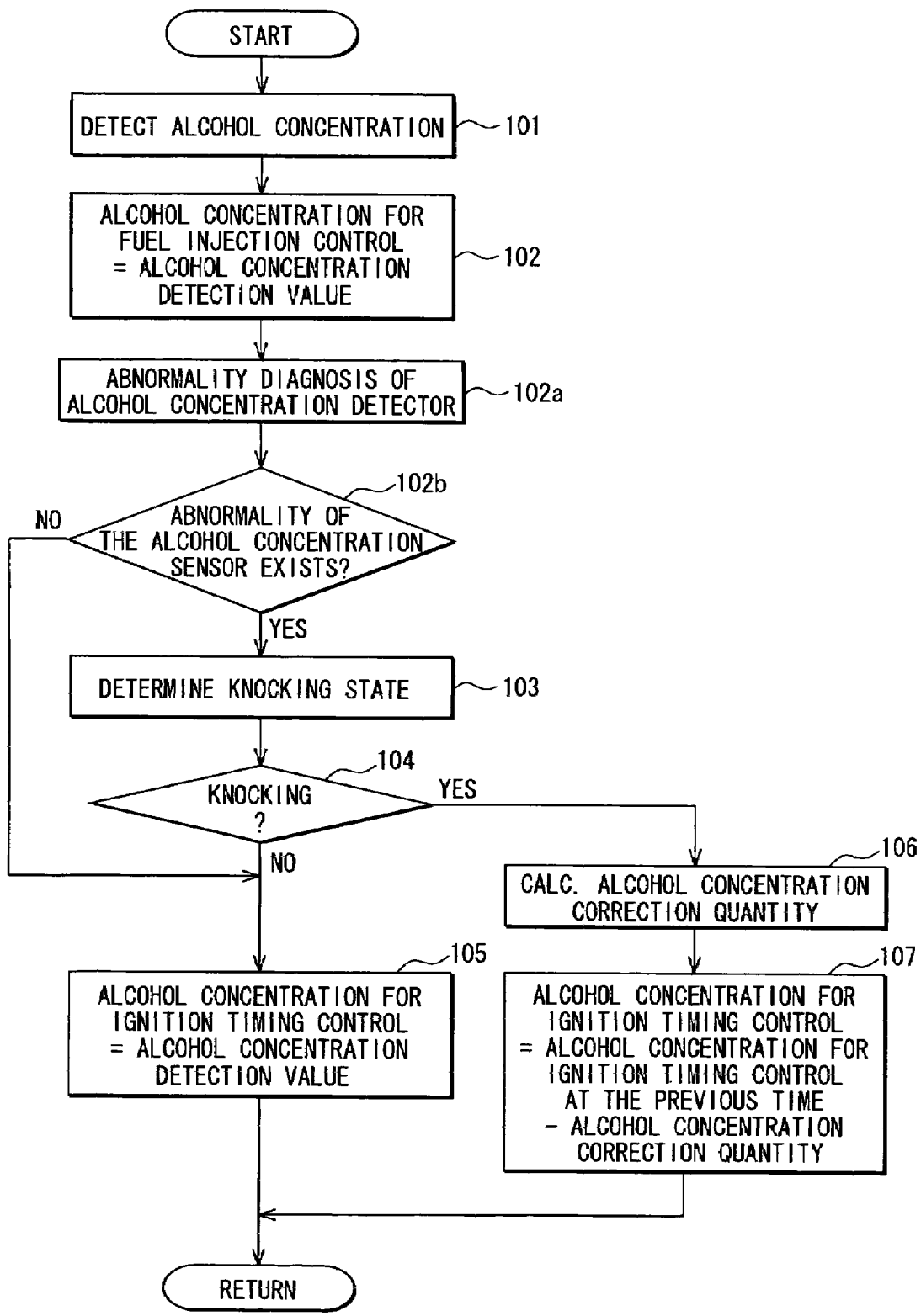
FIG. 5 is a flow chart explaining the process order of an alcohol concentration setting routine in a third embodiment.

Therefore, in the third embodiment, an alcohol concentration setting routine in FIG. 5 is performed. When it is determined that the abnormality of the alcohol concentration detector is present, the alcohol concentration detection value is corrected in accordance with the knocking state and the alcohol concentration detection value after the correction is set as the alcohol concentration for ignition timing control.

The routine in FIG. 5 is a routine established by adding the processes of step 102a and 102b after the process of step 102 of the routine in FIG. 2 explained in the first embodiment and the respective processes other than that are the same as that in FIG. 2.

In the alcohol concentration setting routine in FIG. 5, at step 102 the alcohol concentration detection value is set as the alcohol concentration for fuel injection control as it is. After that, the process goes to step 102a, wherein an abnormality diagnosis as to the alcohol concentration detector is performed to determine presence/absence of abnormality of the alcohol concentration sensor based upon whether or not a change quantity of the alcohol concentration detection quantity (for example, difference between the present value and the previous value) estimated or calculated by the alcohol concentration sensor is within a predetermined range. However, an abnormality diagnosis method of the alcohol concentration sensor may be changed as needed and for example, the presence/absence of abnormality of the alcohol concentration sensor may be determined based upon whether or not the alcohol concentration detection value is within a predetermined range.

Thereafter, the process goes to step 102b, wherein it is determined whether or not the abnormality of the alcohol concentration sensor exists based upon the abnormality diagnosis result of the alcohol concentration sensor. As a result, in a case where it is determined that the abnormality of the alcohol concentration sensor does not exist (normal), the process goes to step 105, wherein the alcohol concentration detection value is set as the alcohol concentration for ignition timing control as it is.

In a case where it is determined at step 102b that the abnormality of the alcohol concentration sensor exists, the process goes to step 104, wherein it is determined whether or not the knocking occurs. As a result, in a case where it is determined that the knocking does not occur, the process goes to step 105, wherein the alcohol concentration detection value is set as the alcohol concentration for ignition timing control as it is. The alcohol concentration detection value immediately before it is determined that the abnormality of the alcohol concentration sensor exists may be set as the alcohol concentration for ignition timing control.

In a case where it is determined at step 104 that the knocking occurs, the process goes to step 106, wherein the alcohol concentration correction quantity is calculated in accordance with the knocking level and thereafter, the process goes to step 107. The alcohol concentration for ignition timing control at the previous time is corrected by using the alcohol concentration correction quantity to find the alcohol concentration for ignition timing control at this time. Thereby, the alcohol concentration detection value corrected in accordance with the knocking level is set as the alcohol concentration for ignition timing control.

The alcohol concentration correction quantity is calculated by using the ignition timing retard quantity in accordance with the knocking level, and the alcohol concentration for ignition timing control at this time may be obtained by correcting the alcohol concentration for ignition timing control at the previous time by using the alcohol concentration correction quantity.

In the third embodiment explained above, when the abnormality of the alcohol concentration sensor occurs to deteriorate the detection accuracy of the alcohol concentration, the alcohol concentration detection value corrected in accordance with the knocking state is used as the alcohol concentration for ignition timing control. Therefore, occurrence of the knocking due to abnormality of the alcohol concentration sensor can be prevented. Further, since the alcohol concentration detection value is not corrected in accordance with the knocking state at a normal time of the alcohol concentration sensor, the ignition timing is not excessively corrected for retard. In consequence, the ignition timing can be controlled close to the knock limit to improve the fuel consumption or the like.

In each of the first to fourth embodiments, the alcohol concentration for ignition timing control at the previous time is corrected by using the alcohol concentration correction quantity in accordance with the knocking level to find the alcohol concentration for ignition timing control at this time. The alcohol concentration for ignition timing control at this time may be found by correcting the alcohol concentration detection value using the alcohol concentration correction quantity in accordance with the knocking level.

Fourth Embodiment

Figure 8:
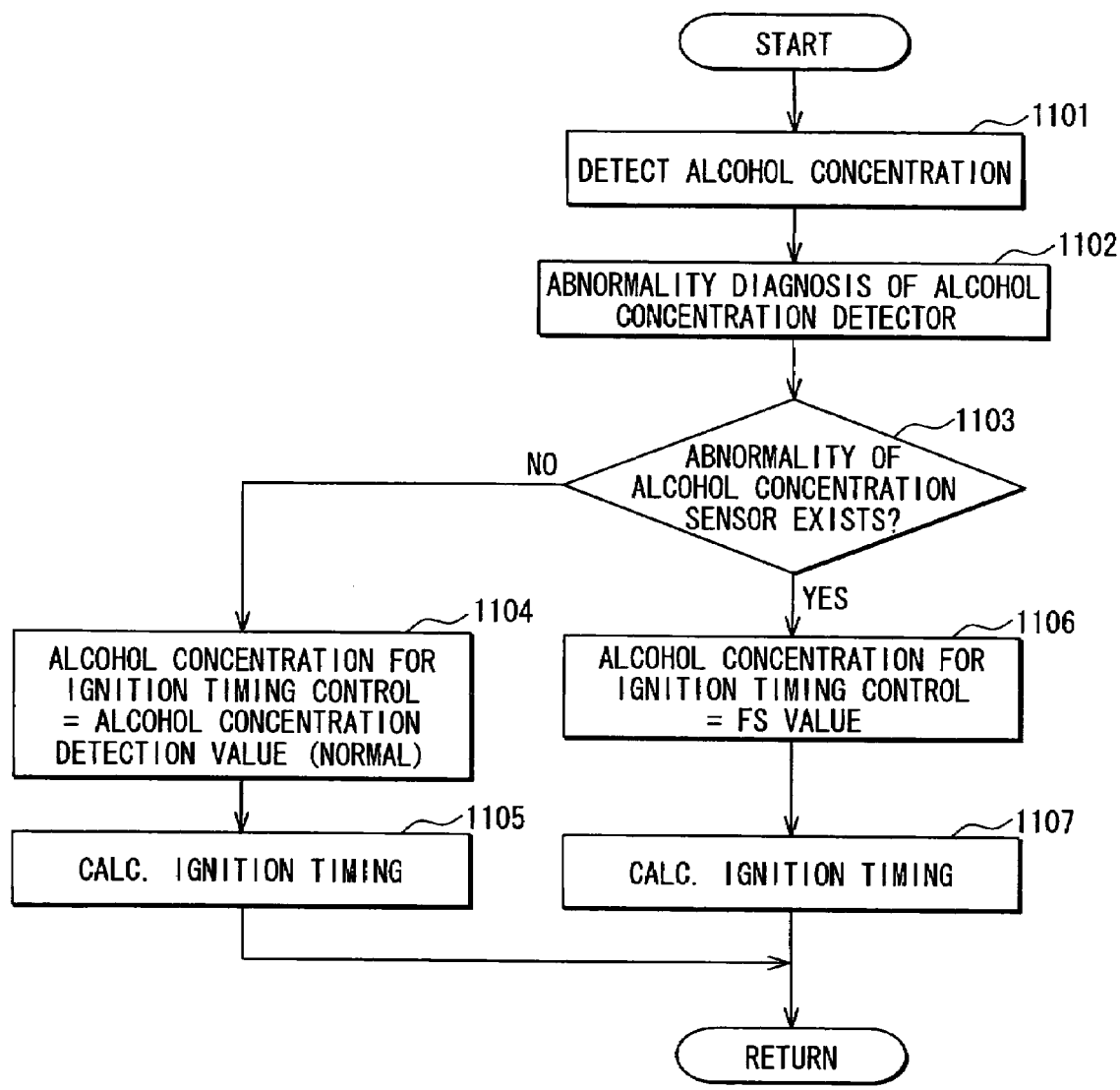
FIG. 8 is a flow chart explaining the process order of an ignition timing control routine in a fourth embodiment.

ECU 43 performs an ignition timing control routine shown in FIG. 8 to control ignition timing of the spark plug 22.

At step 1101, alcohol concentration of the main fuel is calculated, for example, based upon at least one of an air-fuel ratio F/B correction quantity, a deviation quantity of an air-fuel ratio, combustion stability (engine rotational fluctuation), engine torque and the like. In a case of a system provided with an alcohol concentration sensor for detecting alcohol concentration of the main fuel, the alcohol concentration of the main fuel may be detected by the alcohol concentration sensor.

After that, the process goes to step 1102, wherein an abnormality diagnosis as to the alcohol concentration sensor is performed. Presence/absence of abnormality of the alcohol concentration sensor is determined based upon whether or not a change quantity of the alcohol concentration detection quantity of the main fuel (for example, difference between the present value and the previous value) calculated by the alcohol concentration sensor is within a predetermined range. However, an abnormality diagnosis method of the alcohol concentration sensor may be changed as needed and for example, the presence/absence of abnormality of the alcohol concentration sensor may be determined based upon whether or not the alcohol concentration detection value is within a predetermined range.

Thereafter, the process goes to step 1103, wherein it is determined whether or not the abnormality of the alcohol concentration sensor exists based upon the abnormality diagnosis result of the alcohol concentration sensor. As a result, in a case where it is determined that the abnormality of the alcohol concentration sensor does not exist (normal), the process goes to step 1104, wherein the alcohol concentration detection value of the main fuel detected by the alcohol concentration sensor is set as the alcohol concentration for ignition timing calculation.

Alcohol concentration for ignition timing calculation=Alcohol concentration detection value (normal value).

Figure 6:
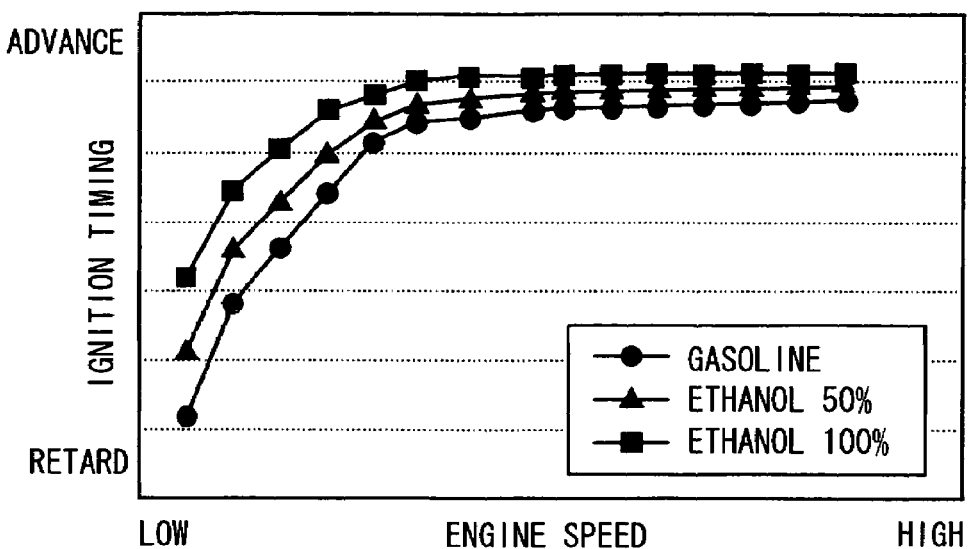
FIG. 6 is a diagram conceptually showing one example of a map of ignition timing.

Thereafter, the process goes to step 1105, wherein by referring to a map of ignition timing shown in FIG. 6, ignition timing is calculated in accordance with alcohol concentration for ignition timing calculation (=alcohol concentration detection value) and an engine operating state (for example, engine speed, engine load or the like).

Figure 7:
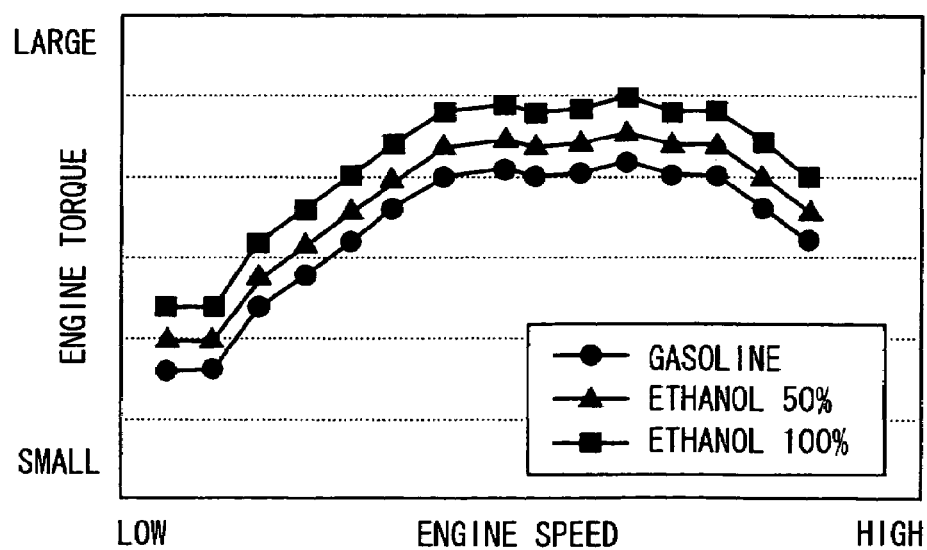
FIG. 7 is a diagram showing a relation between alcohol concentration, engine speed and engine torque.

In general, as the alcohol concentration of fuel supplied to the engine 11 becomes higher, the knock limit of the ignition timing transfers to a more advanced side. Therefore, the map of the ignition timing shown in FIG. 6 is set such that as the alcohol concentration (for example, ethanol concentration) becomes higher, the ignition timing is advanced. Therefore, as shown FIGS. 6 and 7, as the alcohol concentration becomes higher, the ignition timing is advanced to increase the torque.

In a case where the presence of abnormality in the alcohol concentration sensor is determined at step 1103, the process goes to step 1106, wherein predetermined alcohol concentration lower than an alcohol concentration detection value immediately before the presence of abnormality in the alcohol concentration sensor (FS value: failure safe value) is determined is set as the alcohol concentration for ignition timing calculation. Thereby, the alcohol concentration for generating ignition timing retarded by a retard quantity, which is necessary for preventing knocking, from the ignition timing at a normal time of the alcohol concentration sensor (ignition timing in accordance with the alcohol concentration detection value at a normal time of the alcohol concentration sensor) is set as the alcohol concentration for ignition timing calculation.

Alcohol concentration for ignition timing calculation=FS value

For example, in a case where the alcohol concentration detection value immediately before the presence of abnormality in the alcohol concentration sensor is determined is 100%, 50% of the alcohol concentration detection value is set as the alcohol concentration for ignition timing calculation. However, the predetermined alcohol concentration set as the alcohol concentration for ignition timing calculation is not limited to 50%, but may be changed as needed.

Thereafter, the process goes to step 1107, wherein by referring to the map of the ignition timing shown in FIG. 6, the ignition timing is calculated in accordance with alcohol concentration for ignition timing calculation (=predetermined alcohol concentration) and an engine operating state (for example, engine speed, engine load or the like). Thereby, the ignition timing retarded by a retard quantity, which is necessary for preventing the knocking, from the ignition timing at a normal time of the alcohol concentration sensor is set.

In the fourth embodiment explained above, when the presence of abnormality in the alcohol concentration sensor is determined, the ignition timing is set to a more retarded side than at a normal time of the alcohol concentration sensor. Therefore, even if actual alcohol concentration at an abnormal time of the alcohol concentration sensor is lower than an alcohol concentration detection value at a normal time of the alcohol concentration sensor, occurrence of the knocking can be prevented by preventing the ignition timing from going to an advanced side over the knock limit.

Further, the predetermined alcohol concentration lower than the alcohol concentration detection value immediately before the presence of abnormality in the alcohol concentration sensor is determined is set as the alcohol concentration for ignition timing calculation. The ignition timing in accordance with the alcohol concentration for ignition timing calculation is calculated. Thereby, the ignition timing retarded by a retard quantity, which is necessary for preventing the knocking, from the ignition timing at a normal time of the alcohol concentration sensor is set. On the other hand, the conventional system retards the ignition timing until the ignition timing for gasoline (that is, ignition timing when the alcohol concentration is 0%) when the presence of abnormality in the alcohol concentration is determined, and fixes the retarded ignition timing. Therefore, as compared to the conventional system, the retard quantity of the ignition timing can be made smaller and even in a case where the actual alcohol concentration is relatively high, the retard quantity of the ignition timing is not excessively large, making it possible to restrict a reduction in engine torque.

Fifth Embodiment

A fifth embodiment of the present invention will be explained with reference to FIGS. 9 and 10.

Figure 9:
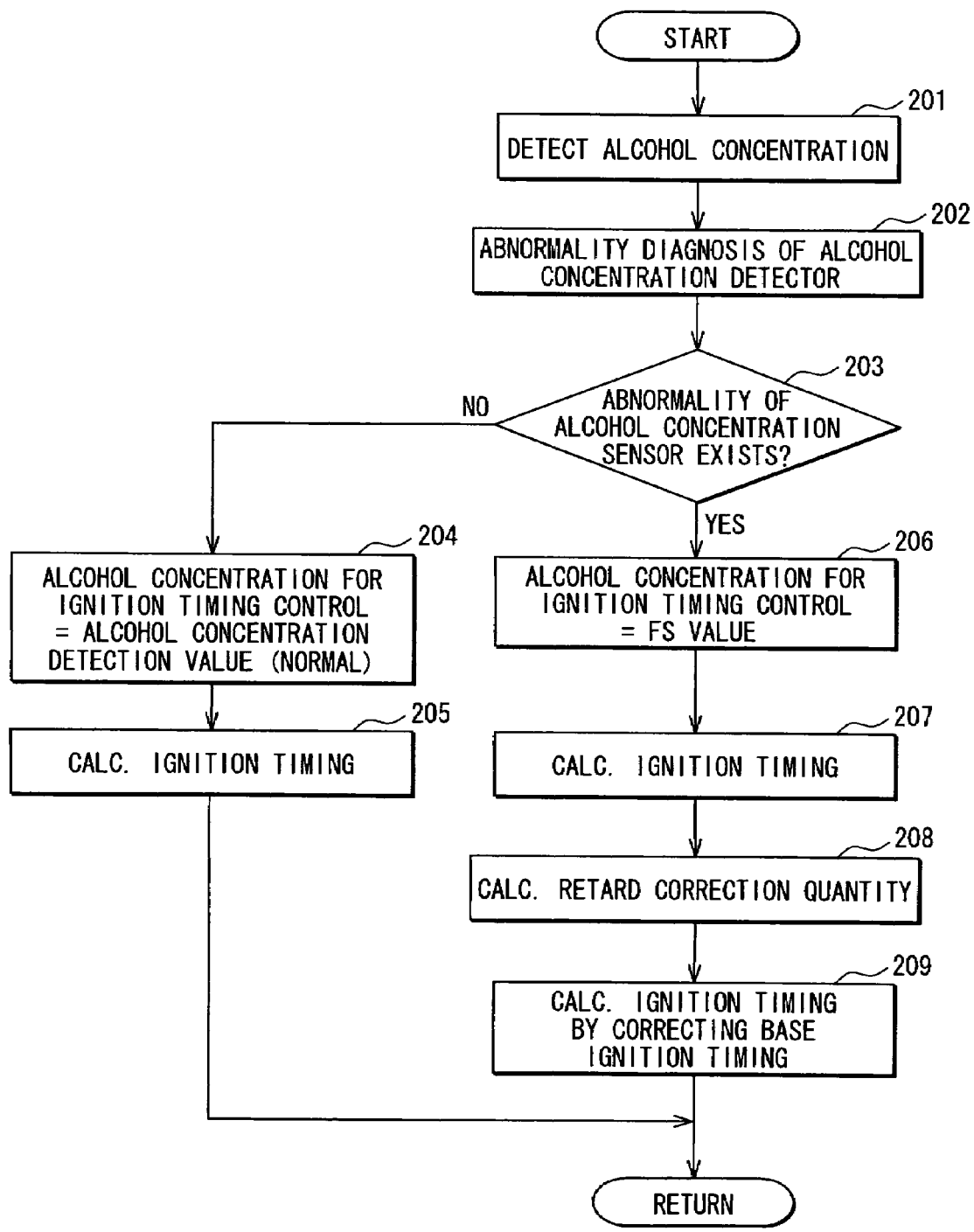
FIG. 9 is a flow chart explaining the process order of an ignition timing control routine in a fifth embodiment.
Figure 10:
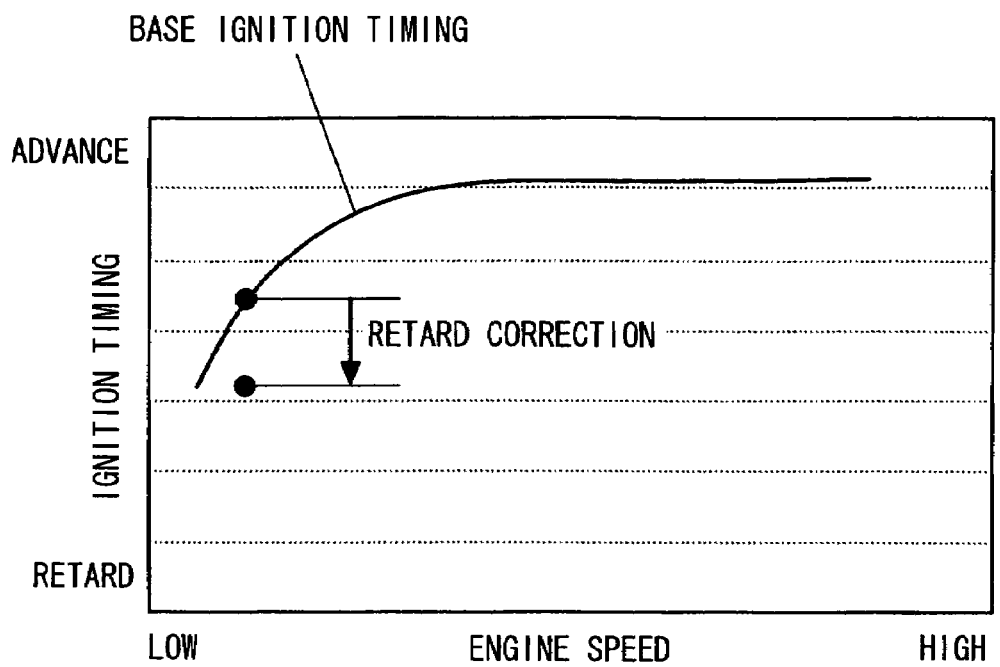
FIG. 10 is a diagram explaining a retard correction of the ignition timing.

In the fifth embodiment, by performing an ignition timing control routine in FIG. 9, in a case where the presence of abnormality in the alcohol concentration sensor is determined, base ignition timing in accordance with an alcohol concentration detection value immediately before the presence of abnormality is determined is retarded by a predetermined value for correction, as shown in FIG. 10. Thereby, the ignition timing is set to a more retarded side than at a normal time of the alcohol concentration sensor.

In the ignition timing control routine in FIG. 9, after alcohol concentration of the main fuel is detected, an abnormality diagnosis of the alcohol concentration sensor is performed to determine whether or not the abnormality exists in the alcohol concentration sensor based upon the abnormality diagnosis result (steps 201 to 203).

As a result, in a case where the alcohol concentration sensor is determined to be normal, the alcohol concentration detection value (normal value) of the main fuel detected by the alcohol concentration sensor is set as the alcohol concentration for ignition timing calculation. After that, by referring to the map of the ignition timing shown in FIG. 6, ignition timing is calculated in accordance with alcohol concentration for ignition timing calculation (=alcohol concentration detection value) and an engine operating state (for example, engine speed, engine load or the like) (steps 204 and 205).

In a case where it is determined at step 203 that the abnormality of the alcohol concentration sensor is present, the process goes to step 206, wherein the alcohol concentration detection value immediately before the presence of abnormality in the alcohol concentration sensor is determined (that is, the alcohol concentration detection value at a normal time of the alcohol concentration sensor) is set as the alcohol concentration for ignition timing calculation.

Alcohol concentration for ignition timing calculation=Alcohol concentration detection value at a normal time (FS value).

Thereafter, the process goes to step 207, wherein by referring to the map of the ignition timing shown in FIG. 6, base ignition timing is calculated in accordance with alcohol concentration for ignition timing calculation (=alcohol concentration detection value at a normal time) and an engine operating state (for example, engine speed, engine load or the like).

Thereafter, the process goes to step 208, wherein a retard correction quantity in accordance with alcohol concentration for ignition timing calculation (alcohol concentration detection value at a normal time) and an engine operating state (for example, engine speed, engine load or the like) is calculated by a map or the like. Thereby, a retard correction quantity necessary for preventing the knocking is found with respect to the base ignition timing.

Thereafter, the process goes to step 209, wherein final ignition timing is, as shown in FIG. 10, found by retarding the base ignition timing for correction by a retard correction quantity. Thereby, the ignition timing retarded by a retard quantity, which is necessary for preventing the knocking, from the ignition timing at a normal time of the alcohol concentration sensor is set.

Also in the fifth embodiment explained above, the advantages substantially similar to the fourth embodiment can be obtained.

Sixth Embodiment

A sixth embodiment of the present invention will be explained with reference to FIGS. 11 and 12.

Figure 11:
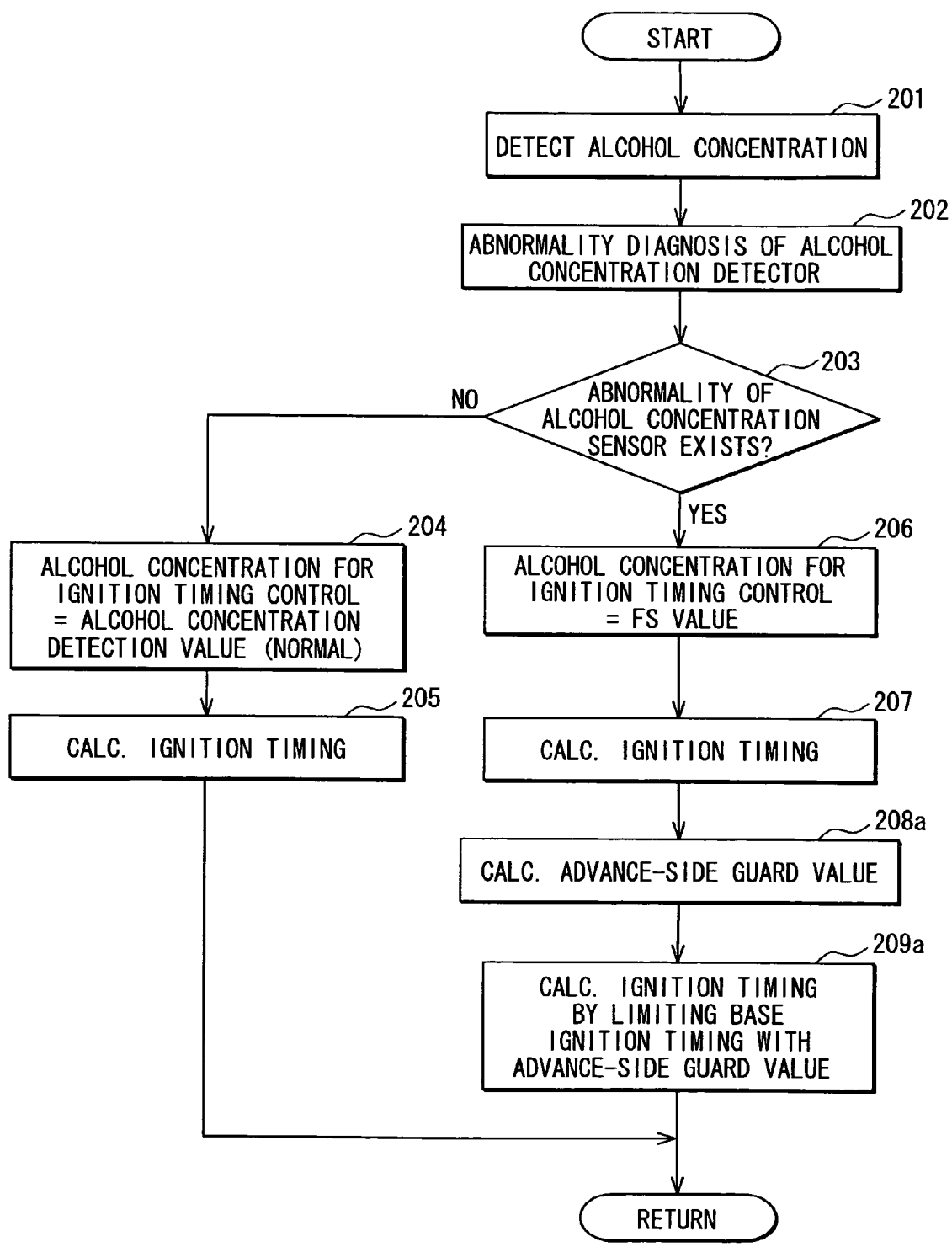
FIG. 11 is a flow chart explaining the process order of an ignition timing control routine in a sixth embodiment.

In the sixth embodiment, by performing an ignition timing control routine in FIG. 11, in a case where the presence of abnormality in the alcohol concentration sensor is determined, base ignition timing in accordance with an alcohol concentration detection value immediately before the presence of abnormality is determined is limited by a predetermined guard value. Thereby, the ignition timing is set to a more retarded side than at a normal time of the alcohol concentration sensor.

The routine in FIG. 11 changes the processes at steps 208 and 209 in the routine in FIG. 9 explained in the fifth embodiment into the processes at steps 208*a* and 209*a* and the processes of the respective steps other than those are the same as that in FIG. 9.

In an ignition timing control routine in FIG. 11, in a case where it is determined that the abnormality of the alcohol concentration sensor exists, the alcohol concentration detection value immediately before the presence of abnormality in the alcohol concentration sensor is determined (that is, the alcohol concentration detection value at a normal time of the alcohol concentration sensor) is set as the alcohol concentration for ignition timing calculation. Thereafter, base ignition timing is calculated in accordance with the alcohol concentration for ignition timing calculation (=alcohol concentration detection value at a normal time) and an engine operating state (for example, engine speed, engine load or the like) (steps 206 and 207).

Figure 12:
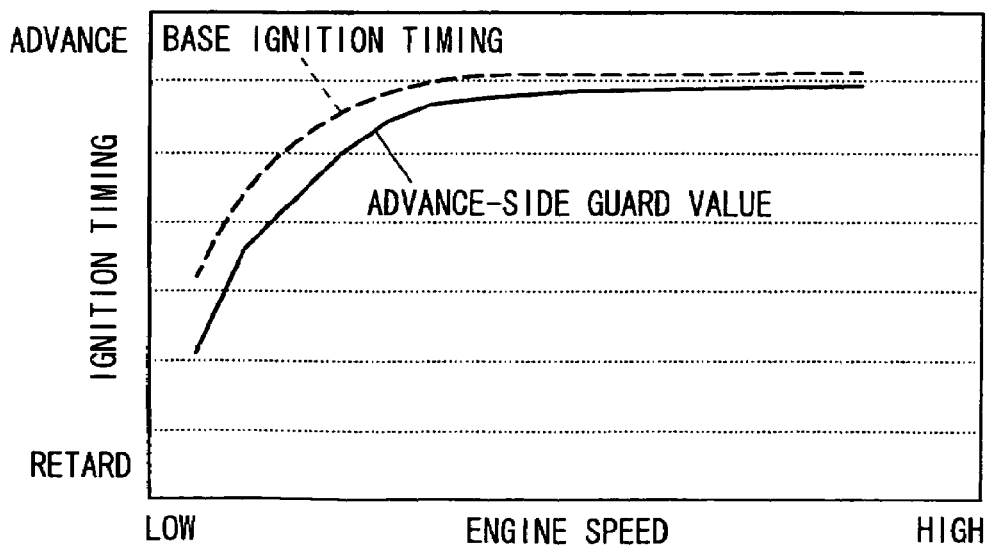
FIG. 12 is a diagram conceptually showing one example of a map of an advance-side guard value.

Thereafter, the process goes to step 208*a* wherein by referring to a map of an advance-side guard value shown in FIG. 12, an advance-side guard value is calculated in accordance with alcohol concentration for ignition timing calculation (=alcohol concentration detection value at a normal time) and an engine operating state (for example, engine speed, engine load or the like). Thereby, an advance-side guard value necessary for preventing the knocking is found with respect to the base ignition timing. The map of the advance-side guard value is not shown, but an advance-side guard value in accordance with an engine operating state is set for every alcohol concentration. However, an advance-side guard value in accordance with an engine operating state may be set in common at every alcohol concentration.

Thereafter, the process goes to step 209*a*, wherein the base ignition timing is guard-processed with the advance-side guard value to limit the base ignition timing in such a manner as to be in a more retarded side than the advance-side guard value, thus finding final ignition timing. Thereby, the ignition timing retarded by a retard quantity, which is necessary for preventing the knocking, is set from the ignition timing at a normal time of the alcohol concentration sensor.

Also in the sixth embodiment explained above, the effect substantially similar to the fourth embodiment can be obtained.

Seventh Embodiment

A seventh embodiment of the present invention will be explained with reference to FIGS. 13 and 14.

Figure 13:
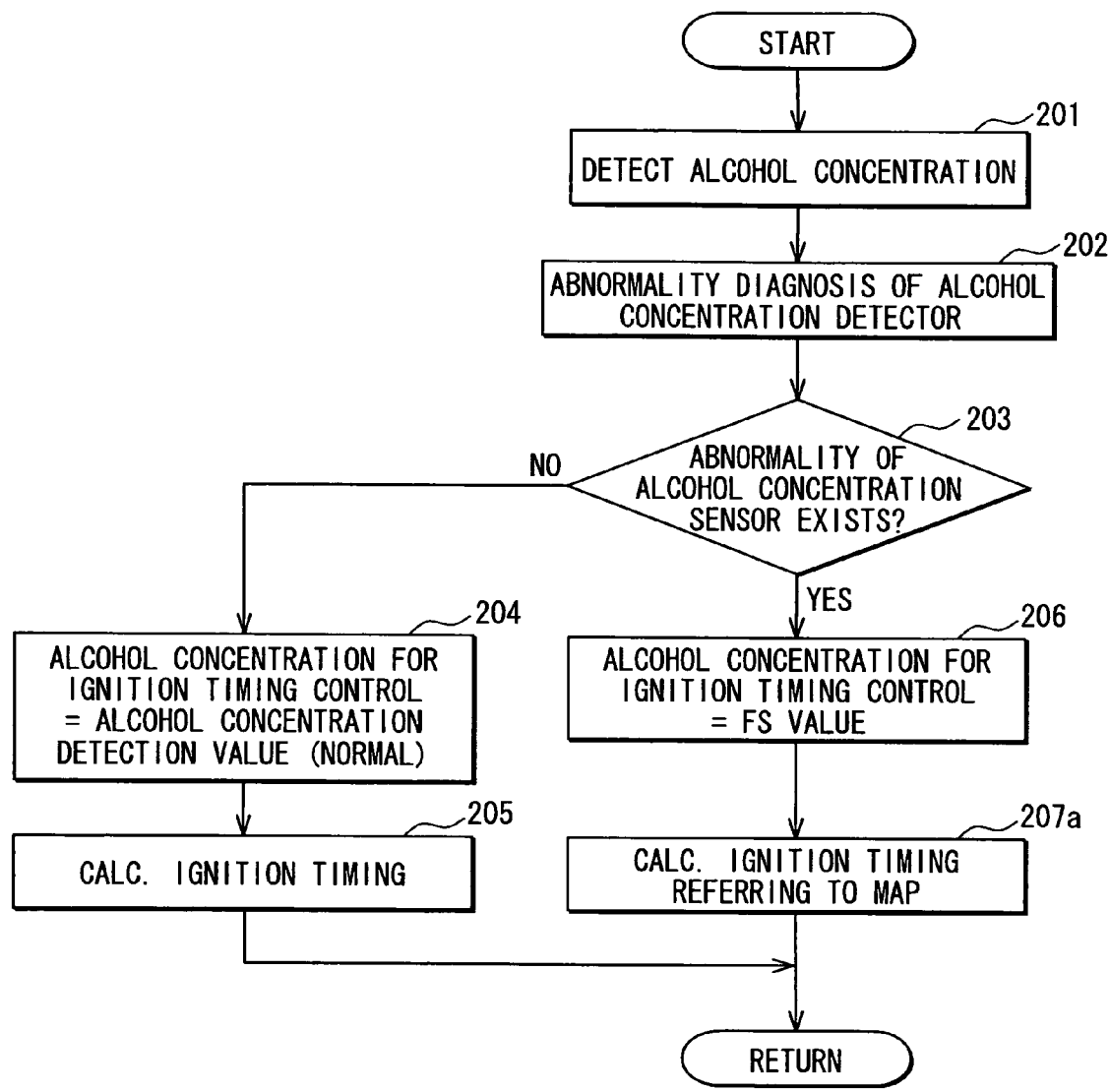
FIG. 13 is a flow chart explaining the process order of an ignition timing control routine in a seventh embodiment.

In the seventh embodiment, by performing an ignition timing control routine in FIG. 13, in a case where the presence of abnormality in the alcohol concentration sensor is determined, ignition timing in accordance with an alcohol concentration detection value immediately before the presence of abnormality is determined is calculated by using an ignition timing map for abnormality. Thereby, the ignition timing is set to a more retarded side than at a normal time of the alcohol concentration sensor.

The routine in FIG. 13 changes the process at step 207 in the routine in FIG. 9 explained in the fifth embodiment into the process at step 207a and omits the processes 208 and 209 in the routine in FIG. 9. The processes of the respective steps other than it are the same as that in FIG. 9.

In the ignition timing control routine in FIG. 13, in a case where it is determined that the abnormality of the alcohol concentration sensor is present, the alcohol concentration detection value immediately before the presence of abnormality in the alcohol concentration sensor is determined (that is, the alcohol concentration detection value at a normal time of the alcohol concentration sensor) is set as the alcohol concentration for ignition timing calculation (step 206).

Figure 14:
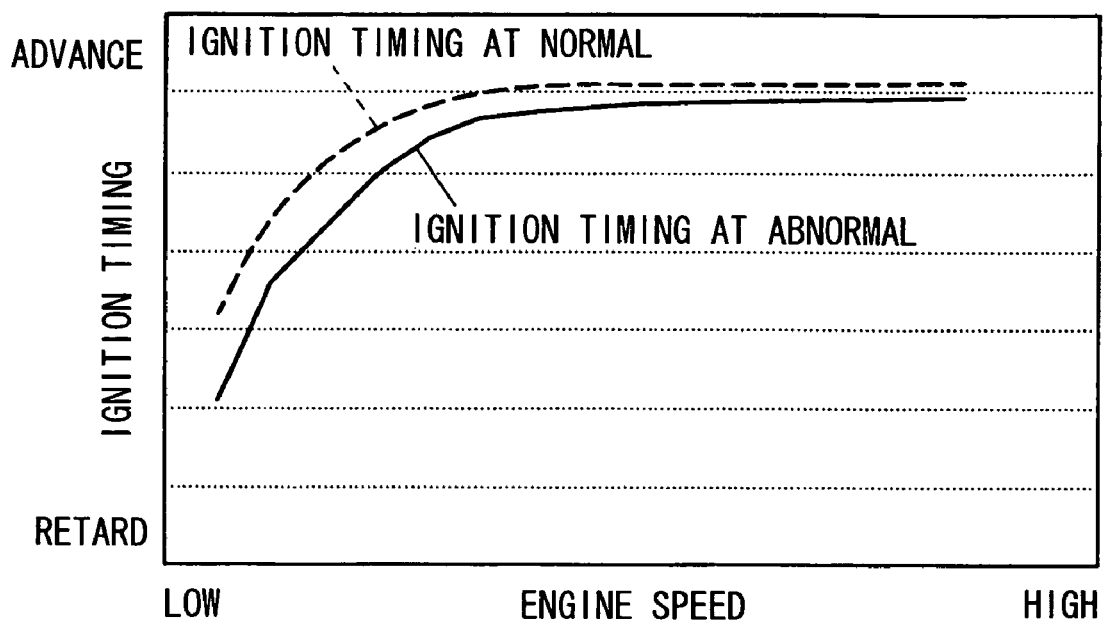
FIG. 14 is a diagram conceptually showing one example of a map of ignition timing at an abnormal time.

Thereafter, the process goes to step 207a wherein by referring to a map of the ignition timing for abnormality shown in FIG. 14, ignition timing is calculated in accordance with alcohol concentration for ignition timing calculation (=alcohol concentration detection value at a normal time) and an engine operating state (for example, engine speed, engine load or the like). Thereby, the ignition timing retarded by a retard quantity, which is necessary for preventing the knocking, from the ignition timing at a normal time of the alcohol concentration sensor is set.

The map of the ignition timing for abnormality is produced by mapping data of the ignition timing retarded by a retard quantity necessary for preventing the knocking from the ignition timing data in the map (refer to FIG. 6) of the ignition timing at a normal time of the alcohol concentration sensor. Although not shown therein, the ignition timing for abnormality in accordance with an engine operating state is set for every alcohol concentration. However, the ignition timing for abnormality in accordance with an engine operating state may be set in common at every alcohol concentration Also in the seventh embodiment explained above, the effect substantially similar to the fourth embodiment can be obtained.

In addition, in each of the embodiments 1 to 7, the present invention is applied to the system provided with the supplementary fuel injection device composed of the injection nozzle 19, the sub fuel tank 38, the sub fuel pump 39 and the like, but may be applied to a system not provided with the sub fuel injection device.

The present invention should not be limited to the disclosure embodiments, but may be implemented in many other ways without departing from the spirit of the present invention.

What is claimed is:

1. A controller for an internal combustion engine provided with alcohol concentration determining means which detects or estimates alcohol concentration of fuel supplied to the internal combustion engine, comprising:
    alcohol concentration setting means for fuel injection which sets an alcohol concentration detection value detected or estimated by the alcohol concentration determining means as alcohol concentration for a fuel injection control;
    knock determining means which determines a knocking state of the internal combustion engine; and
    alcohol concentration setting means for ignition timing control which corrects the alcohol concentration detection value in accordance with the knocking state determined by the knock determining means and sets the alcohol concentration detection value after the correction as alcohol concentration for ignition timing control.

2. A controller for an internal combustion engine according to claim 1, wherein:
    the alcohol concentration setting means for ignition timing control corrects the alcohol concentration detection value by using an ignition timing retard quantity in accordance with the knocking state and sets the alcohol concentration detection value after the correction as the alcohol concentration for ignition timing control.

3. A controller for an internal combustion engine according to claim 1, further comprising:
    abnormality diagnosis means which determines presence/absence of abnormality of the alcohol concentration determining means, wherein:
    when presence of abnormality in the alcohol concentration determining means is determined, the alcohol concentration setting means for ignition timing control corrects the alcohol concentration detection value in accordance with the knocking state and performs a process of setting the alcohol concentration detection value after the correction as the alcohol concentration for ignition timing control.

4. A controller for an internal combustion engine provided with alcohol concentration detecting means which detects alcohol concentration of fuel supplied to the internal combustion engine and ignition timing setting means which sets ignition timing in accordance with an alcohol concentration detection value detected by the alcohol concentration detecting means, comprising:
    abnormality diagnosis means which determines presence/absence of abnormality in the alcohol concentration detecting means, wherein:
    when the presence of the abnormality in the alcohol concentration detecting means is determined, the ignition timing setting means sets the ignition timing to a more retarded side than at a normal time of the alcohol concentration detecting means by using the alcohol concentration detection value before the presence of the abnormality is determined.

5. A controller for an internal combustion engine according to claim 4, wherein:
    when the presence of the abnormality in the alcohol concentration detecting means is determined, the ignition timing setting means sets predetermined alcohol concentration lower than the alcohol concentration detection value immediately before the presence of the abnormality is determined as the alcohol concentration for ignition timing calculation and calculates ignition timing in accordance with the alcohol concentration for ignition timing calculation, thereby setting the ignition timing to a more retarded side than at a normal time of the alcohol concentration detecting means.

6. A controller for an internal combustion engine according to claim 4, wherein:
    when the presence of the abnormality in the alcohol concentration detecting means is determined, the ignition timing setting means retards ignition timing for correction in accordance with the alcohol concentration detection value immediately before the presence of the abnormality is determined by a predetermined quantity, thereby setting the ignition timing to a more retarded side than at a normal time of the alcohol concentration detecting means.

7. A controller for an internal combustion engine according to claim 4, wherein:

when the presence of the abnormality in the alcohol concentration detecting means is determined, the ignition timing setting means limits ignition timing in accordance with the alcohol concentration detection value immediately before the presence of the abnormality is determined by a predetermined guard value quantity, thereby setting the ignition timing to a more retarded side than at a normal time of the alcohol concentration detecting means.

8. A controller for an internal combustion engine according to claim 4, wherein:

when the presence of the abnormality in the alcohol concentration detecting means is determined, the ignition timing setting means calculates ignition timing in accordance with the alcohol concentration detection value immediately before the presence of the abnormality is determined by using an ignition timing map for abnormality, thereby setting the ignition timing to a more retarded side than at a normal time of the alcohol concentration detecting means.

9. A method of controlling an internal combustion engine comprising:

detecting or estimating alcohol concentration of fuel supplied to the internal combustion engine;

setting an alcohol concentration detecting value of the detected or estimated alcohol concentration as alcohol concentration for a fuel injection control;

determining a knocking state of the internal combustion engine; and correcting the alcohol concentration detection value in accordance with the determined knocking state and setting the alcohol concentration detection value after the correction as alcohol concentration for ignition timing control.

10. A method according to claim 9, wherein:

said correcting the alcohol concentration detection value is performed by using an ignition timing retard quantity in accordance with the knocking state and setting the alcohol concentration detection value after the correction as the alcohol concentration for ignition timing control.

11. A method according to claim 9, further comprising:

determining presence/absence of abnormality in said detecting or estimating of the alcohol concentration of the fuel supplied to the internal combustion engine, wherein:

when presence of abnormality in said detecting or estimating of the alcohol concentration of the fuel supplied to the internal combustion engine is determined, the alcohol concentration detection value is corrected in accordance with the knocking state and a process of setting the alcohol concentration detection value is performed after the correction as the alcohol concentration for ignition timing control.

12. A method of controlling an internal combustion engine comprising:

detecting alcohol concentration of fuel supplied to the internal combustion engine;

setting ignition timing in accordance with an alcohol concentration detection value of the detected alcohol concentration;

determining presence/absence of abnormality in said detecting the alcohol concentration of fuel supplied to the internal combustion engine, wherein:

when the presence of the abnormality in said detecting the alcohol concentration of fuel supplied to the internal combustion engine is determined, the ignition timing is set to a more retarded side than at a normal time of said detecting the alcohol concentration of fuel supplied to the internal combustion engine by using the alcohol concentration detection value before the presence of the abnormality is determined.

13. A method according to claim 12, wherein:

when the presence of the abnormality in said detecting the alcohol concentration of fuel supplied to the internal combustion engine is determined, a predetermined alcohol concentration lower than the alcohol concentration detection value is set immediately before the presence of the abnormality is determined as the alcohol concentration for ignition timing calculation and an ignition timing is calculated in accordance with the alcohol concentration for ignition timing calculation, thereby setting the ignition timing to a more retarded side than at a normal time of said detecting the alcohol concentration of fuel supplied to the internal combustion engine.

14. A controller for an internal combustion engine according to claim 12, wherein:

when the presence of the abnormality in said detecting the alcohol concentration of fuel supplied to the internal combustion engine is determined, the ignition timing is retarded for correction in accordance with the alcohol concentration detection value immediately before the presence of the abnormality is determined by a predetermined quantity, thereby setting the ignition timing to a more retarded side than at a normal time of said detecting the alcohol concentration of fuel supplied to the internal combustion engine.

15. A method according to claim 12, wherein:

when the presence of the abnormality in said detecting the alcohol concentration of fuel supplied to the internal combustion engine is determined, ignition timing is limited in accordance with the alcohol concentration detection value immediately before the presence of the abnormality is determined by a predetermined guard value quantity, thereby setting the ignition timing to a more retarded side than at a normal time of said detecting the alcohol concentration of fuel supplied to the internal combustion engine.

16. A method according to claim 12, wherein:

when the presence of the abnormality in said detecting the alcohol concentration of fuel supplied to the internal combustion engine is determined, the ignition timing is calculated in accordance with the alcohol concentration detection value immediately before the presence of the abnormality is determined by using an ignition timing map for abnormality, thereby setting the ignition timing to a more retarded side than at a normal time of said detecting the alcohol concentration of fuel supplied to the internal combustion engine.

* * * * *